US006816438B1

(12) United States Patent
Zeller

(10) Patent No.: US 6,816,438 B1

(45) Date of Patent: Nov. 9, 2004

(54) TRAVEL ALARM

(76) Inventor: Noel E. Zeller, c/o Zelco Industries, Inc., 65 Haven Ave., Mount Vernon, NY (US) 10553-4445

( * ) Notice: Subject to any disclaimer, the term of this patent is extended or adjusted under 35 U.S.C. 154(b) by 307 days.

(21) Appl. No.: 09/641,793

(22) Filed: Aug. 18, 2000

(51) Int. Cl.[7] .......................... G04B 47/00; G02B 27/02

(52) U.S. Cl. .......................... 368/10; 368/278; 359/809

(58) Field of Search .................. 368/276, 10, 277–279, 368/281–283, 286, 309; 359/802, 803, 817, 819, 798; D10/30

(56) References Cited

U.S. PATENT DOCUMENTS

| | | | | | |
|---|---|---|---|---|---|
| 2,679,785 | A | * | 6/1954 | Batt | 368/281 |
| 3,937,320 | A | * | 2/1976 | Chao et al. | 206/116 |
| 4,424,967 | A | * | 1/1984 | Yokoi et al. | 463/29 |
| 4,504,062 | A | * | 3/1985 | Smith et al. | 463/2 |
| 4,763,986 | A | * | 8/1988 | Sego | 359/798 |
| 5,119,239 | A | * | 6/1992 | Iaquinto et al. | 359/811 |
| 5,165,779 | A | * | 11/1992 | Tortola et al. | 362/109 |
| 5,365,499 | A | * | 11/1994 | Sell | 368/262 |
| D355,370 | S | * | 2/1995 | Chodat | D10/30 |
| 5,642,234 | A | * | 6/1997 | Altman et al. | 359/802 |
| 5,883,860 | A | * | 3/1999 | McKay | 368/281 |
| 5,937,681 | A | * | 8/1999 | Myhr et al. | 359/803 |
| 5,967,643 | A | * | 10/1999 | Chan | 359/802 |
| 6,347,796 | B1 | * | 2/2002 | Grossman et al. | 273/148 B |
| 6,483,651 | B1 | * | 11/2002 | Maurer | 368/802 |

* cited by examiner

*Primary Examiner*—Randy W. Gibson
*Assistant Examiner*—Jeanne-Marguerite Goodwin
(74) *Attorney, Agent, or Firm*—Cooper & Dunham LLP; Donald S. Dowden

(57) ABSTRACT

A clock has a face for telling time, a light for illuminating the face, and a switch for controlling the light. The switch cannot be used for turning the light on when the clock is stored. This conserves the clock battery by preventing accidental discharge of the battery when the clock is stored, for example in a suitcase. A magnifying lens is automatically moved to an optimal position relative to the clock face to magnify the face when the clock is deployed to display the time. The magnifying lens can also be used independently to magnify, and optionally illuminate, another object.

6 Claims, 6 Drawing Sheets

TRAVEL ALARM

BACKGROUND OF THE INVENTION

1. Field of the Invention

This invention relates to travel alarms and, more particularly, to a novel and highly effective travel alarm that can be used in the dark, has a long-lasting battery, is small yet easy to read, and has an important auxiliary use.

2. Description of the Prior Art

Travel alarms are a useful backup for guests at hotels and motels. Such establishments usually offer a wake-up service, but the service sometimes fails. Private homes, campsites, and cruise ships may not offer a wake-up service. Moreover, a time reminder in a hotel lobby, at an airport, train station, etc., may be unavailable. A travel alarm can be used in such cases as a reminder of an appointment, of a task that needs to be accomplished, of a train or plane to board, etc. Many travelers therefore regard travel alarms as indispensable.

However, conventional travel alarms have some serious drawbacks. Those that do not have an illuminated face cannot be easily used in the dark. If a person traveling with such an alarm wishes to check the time in a darkened room in the middle of night, it is first necessary to turn on a light, which can cause eye discomfort and disturb anyone else who happens to be in the room.

On the other hand, if the face is illuminated, this constitutes a serious drain on the clock battery, especially if the clock light is accidentally turned on while the clock is, say, packed in a suitcase. If the timekeeping mechanism of the clock is powered by the same battery, there is a risk of battery failure rendering the clock useless until the battery can be replaced or recharged.

A travel alarm should be physically small and weigh little for easy packing. However, a small clock face can be difficult to read.

Another problem with conventional travel alarm clocks is that they serve no purpose other than telling the time and sounding an alarm at a set time. Other functions that a traveler may desire necessitate the carrying of other items. This makes packing more difficult and increases the probability that a needed item will be left at home or, worse, in a hotel when the traveler moves on.

OBJECTS AND SUMMARY OF THE INVENTION

An object of the invention is to remedy the problems of conventional travel alarm clocks noted above and, in particular, to provide a travel alarm clock that can be used in the dark, that has a long-lasting battery, that is small yet easy to read, and that has an important auxiliary use.

The foregoing and other objects are attained in accordance with the invention by providing a clock having a face, a light for illuminating the face, a switch for controlling the light, and means preventing the switch from turning the light on when the clock is stored and enabling the switch to turn the light on when the clock is deployed.

In accordance with an independent aspect of the invention, there is provided a clock comprising a face, a magnifying lens that can overlie the face so that the lens magnifies the face or can be displaced relative to the face so that it can magnify another object, and a light fixed relative to the lens for illuminating the lens. A switch controls the light, and a cover covers the lens and face when the clock is stored and uncovers at least the face when the clock is deployed. A shaft is fixed relative to the cover and can pivot about an axis relative to the face and lens to displace the cover from the face. A first pair of contacts is fixed relative to the cover, and a second pair of contacts is fixed relative to the lens. The contacts are sufficiently aligned to enable the switch to turn the light on only when the cover and lens are sufficiently displaced relative to each other.

In accordance with another independent aspect of the invention, there is a provided a clock comprising a face and a magnifying lens and being capable of assuming a storage configuration and at least one deployment configuration. The lens and face are adjacent to each other in the storage configuration and spaced apart from each other in the deployment configuration. In the storage configuration, the overall dimensions of the clock are minimized. In the deployment configuration, the lens is optimally positioned to magnify the face or can be used to magnify another object.

BRIEF DESCRIPTION OF THE DRAWINGS

A better understanding of the objects, features and advantages of the invention can be gained from the following detailed description of the preferred embodiments thereof, in conjunction with the appended figures of the drawing, wherein.

DESCRIPTION OF THE PREFERRED EMBODIMENTS

Figure 1:
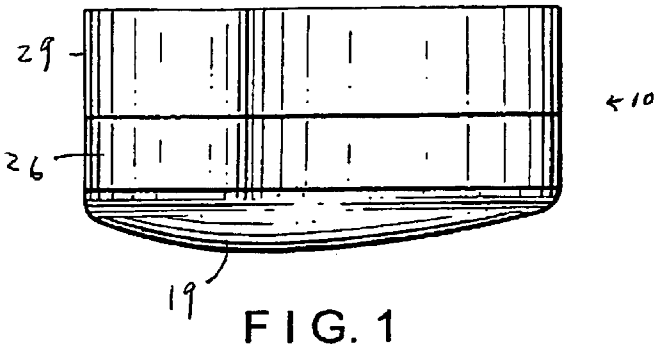
FIG. 1 is a top view of an embodiment of the invention in a storage configuration.
Figure 2:
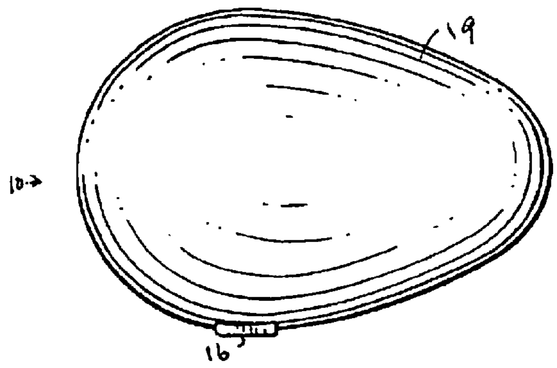
FIG. 2 is a front view corresponding to FIG. 1.
Figure 3:
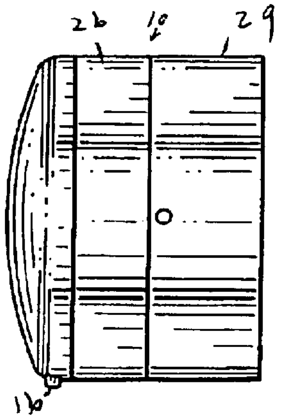
FIG. 3 is a right view thereof.
Figure 4:
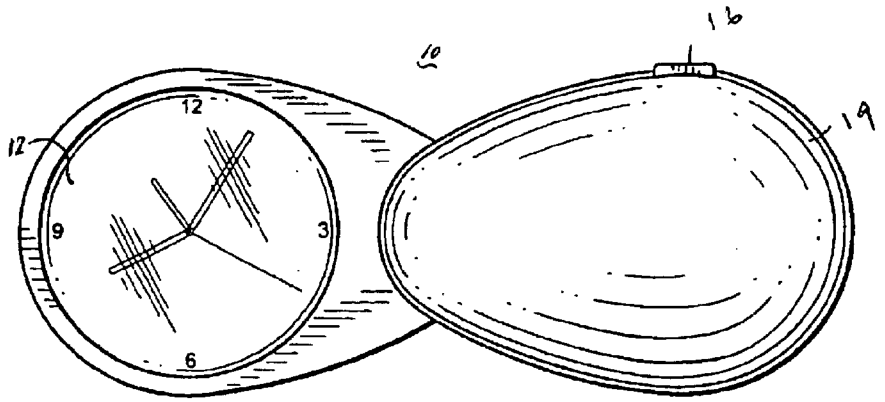
FIG. 4 is a view corresponding to FIG. 2 showing the clock in a first deployment configuration.
Figure 5:
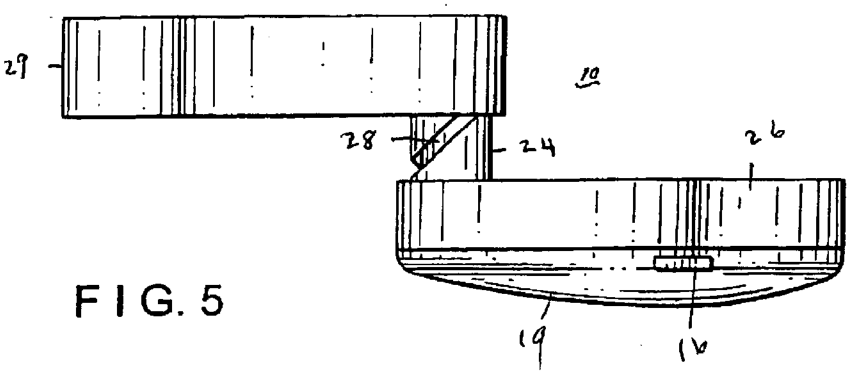
FIG. 5 is a top view corresponding to FIG. 4.
Figure 6:
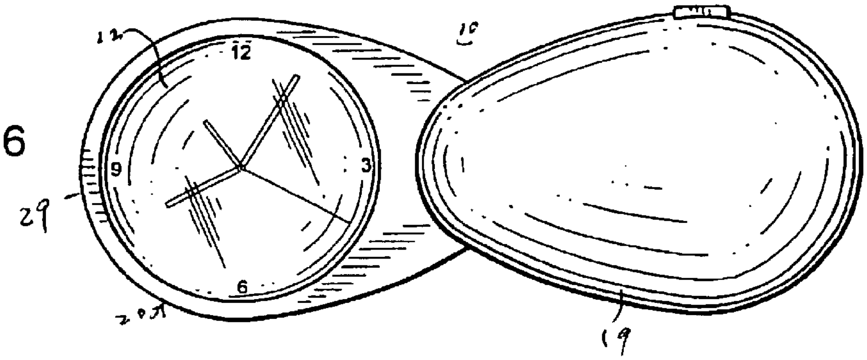
FIG. 6 is a view corresponding to FIG. 4 with the lens positioned to magnify the clock face.

The figures show a clock 10, preferably a travel alarm clock. The clock 10 comprises a face 12, a light 14 such as a light-emitting diode (LED) for illuminating the face 12, and a switch 16 for controlling the light 14.

In accordance with the invention, means 18 is provided for preventing the switch 16 from turning the light 14 on when the clock 10 is stored and enabling the switch 16 to turn the light 14 on when the clock 10 is deployed, either for displaying the time or for performing an important auxiliary function described below. The preventing means 18 comprises a cover 19 that covers the face 12 when the clock 10 is stored and uncovers the face 12 when the clock 10 is deployed for displaying the time.

Figure 7:
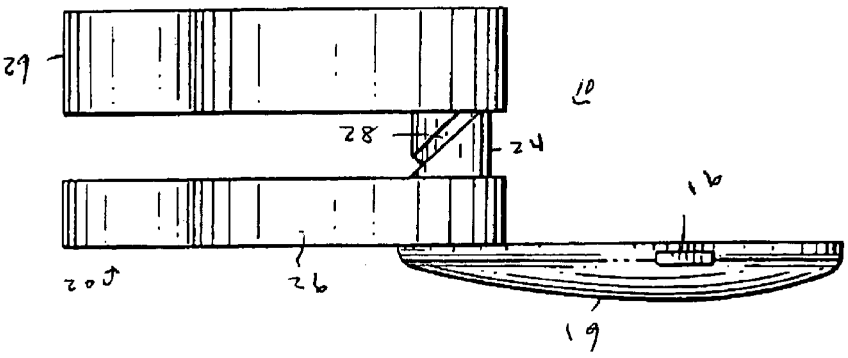
FIG. 7 is a top view corresponding to FIG. 6.
Figure 8:
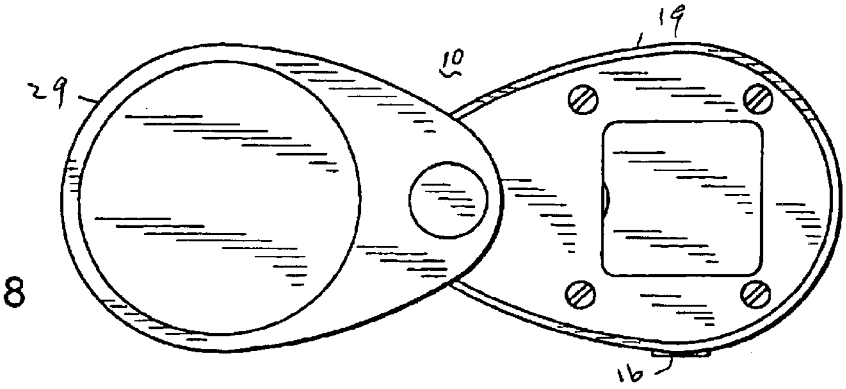
FIG. 8 is a rear view corresponding to FIG. 7.
Figure 9:
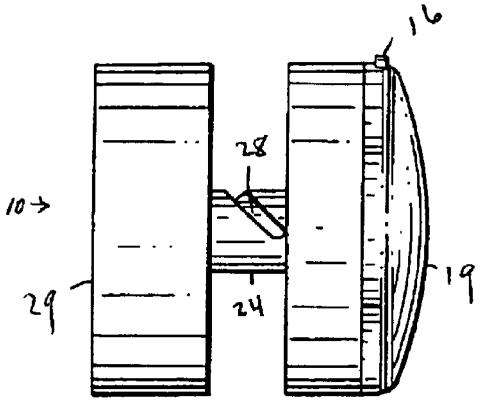
FIG. 9 is a left-side view corresponding to FIGS. 4 and 5.
Figure 10:
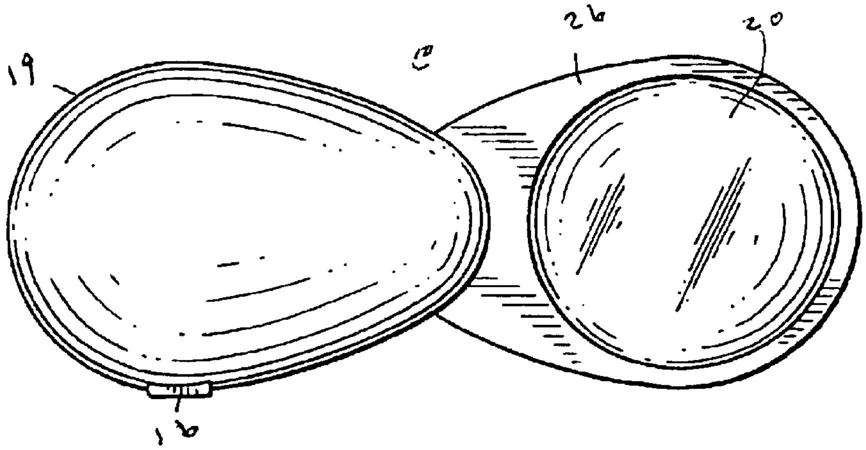
FIG. 10 is a front view showing a second deployment configuration, in which the lens deployed for magnifying an object other than the clock face.
Figure 11:
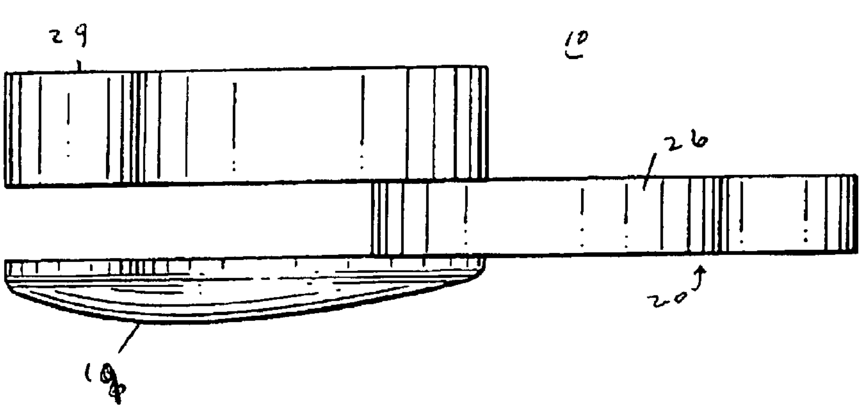
FIG. 11 is a top view corresponding to FIG. 10.
Figure 14:
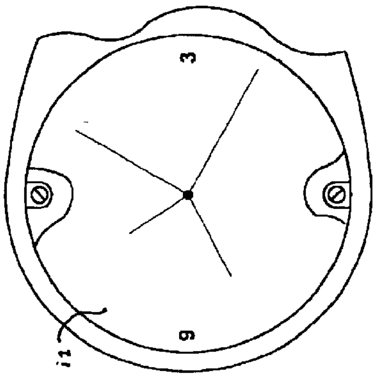
FIG. 14 is a fragmentary view taken along the line 14—14 of FIG. 13, looking in the direction of the arrows, and showing the clock face.
Figure 17:
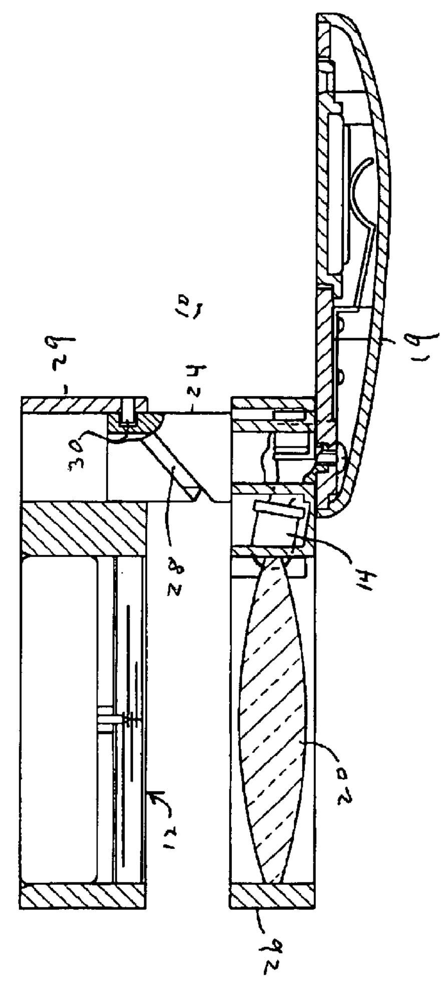
FIG. 17 is a top view in cross-section corresponding to FIG. 16.

A magnifying lens 20 is provided that can overlie the face 12 so that the lens 20 magnifies the face 12 as illustrated, for example, in FIGS. 7 and 17. Alternatively, the magnifying lens 20 can be displaced relative to the face 12 so that the lens 20 can magnify another object. See for example FIG. 11.

The cover 19 is fixed relative to a shaft 24. The shaft 24 and cover 19 can pivot together relative to the face 12 and lens 20. The lens 20 is mounted in a housing 26 that is fixed axially on the shaft 24 but that can pivot about the shaft 24 freely through any angle, including a full circle (360 degrees).

The shaft 24 is provided with a cam groove 28. A cam follower 30 fixed relative to the clock face 12 tracks in the cam groove 28. The cam groove 28 is helical and extends substantially 180 degrees around the axis of the shaft 24. Upon rotation of the shaft 24 and cover 19 from the storage configuration illustrated for example in FIG. 1 to the first deployment configuration illustrated for example in FIG. 17, the cam follower 30 tracks from the end of the cam 28 nearest the cover 19, lens 20, and lens housing 26 to the end of the cam 28 nearest the clock face 12 and clock housing 29. Since the clock housing 29 is slidable axially on the shaft 24 as the shaft rotates relative to the housing, this increases the perpendicular separation (i.e., the separation in a direction parallel to the axis of the shaft 24) between the lens 20 and the face 12. The pitch of the cam 28 is such that, in the deployed position illustrated in FIG. 17, wherein the cover 19 and the shaft 24 are pivoted substantially 180 degrees relative to the clock face 12, the lens 20 is optimally positioned to magnify the face 12.

As mentioned above, means 18 is provided for preventing the switch 16 from turning the light 14 on when the clock 10 is stored and enabling the switch 16 to turn the light 14 on when the clock 10 is deployed. The preventing means is best illustrated in FIGS. 12, 15, 16, 19, 20, and 22.

Figure 15:
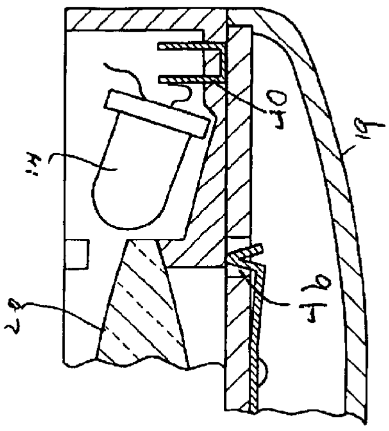
FIG. 15 is a view taken along the line 15—15 of FIG. 12 and looking in the direction of the arrows.
Figure 12:
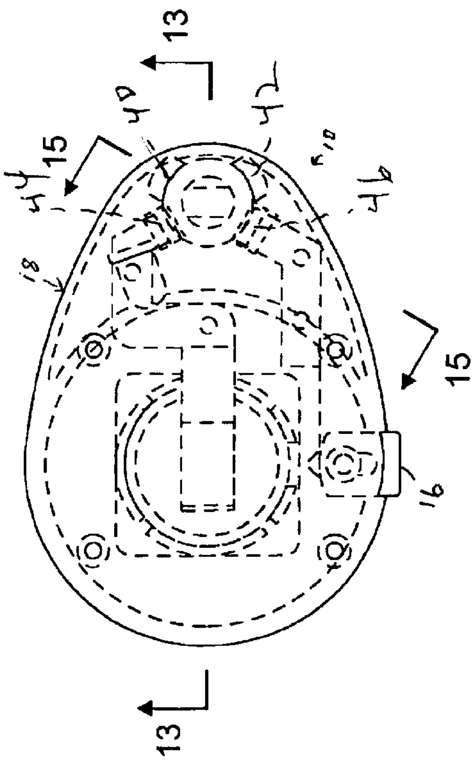
FIG. 12 is a view corresponding to FIG. 2 showing in broken lines some interior mechanism.
Figure 13:
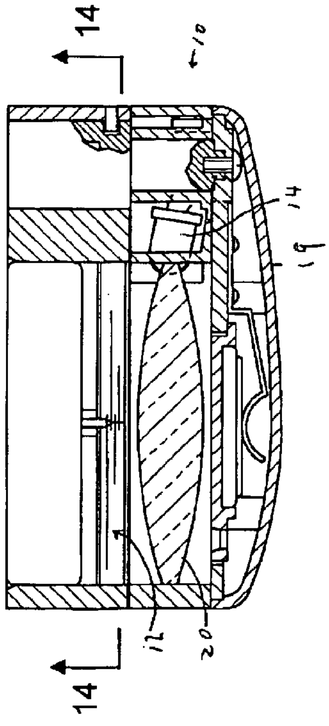
FIG. 13 is a view taken along the line 13—13 of FIG. 12 and looking in the direction of the arrows.
Figure 18:
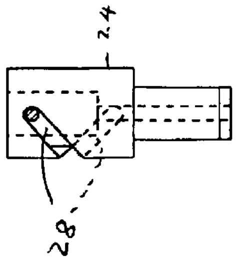
FIG. 18 is a side view of a shaft including a cam slot in accordance with the invention.

In the closed or storage configuration illustrated for example in FIGS. 1 and 12, LED contacts 40 and 42 are displaced from a plus switch contact 44 and a minus battery contact 46 (FIGS. 12 and 15). In this configuration, even if the switch 16 is pressed, it will not close a circuit to the light 14. Consequently, if the clock 10 is packed in a storage configuration illustrated in FIG. 1 and the switch 16 is inadvertently pressed because of contact with, for example, another item in a suitcase, the LED 14 will not turn on, and the clock battery or batteries will not be discharged by the LED. (Of course, a conventional circuit from the clock battery or batteries to the timekeeping mechanism, such as a quartz mechanism, enables the timekeeping mechanism to track the time continuously, even when the clock 10 is stored. The timekeeping function draws very little current compared to the LED 14.

Figure 22:
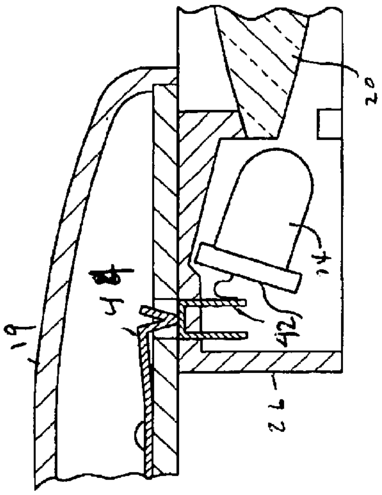
FIG. 22 is a sectional view taken along the bent line 22—22 of FIG. 20 and looking in the direction of the arrows.
Figure 20:
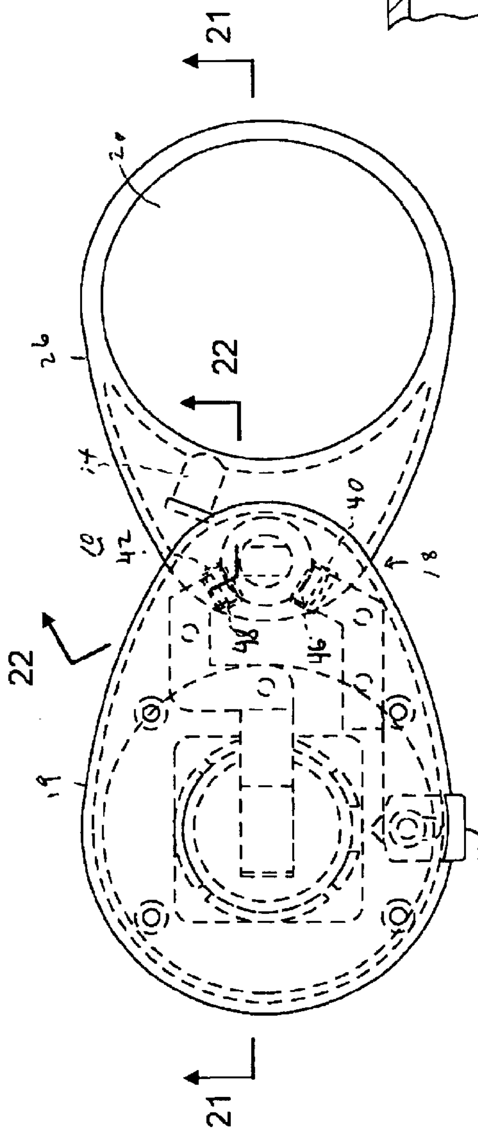
FIG. 20 is a rear view of the clock with the lens deployed showing the interior mechanism in broken lines.
Figure 21:
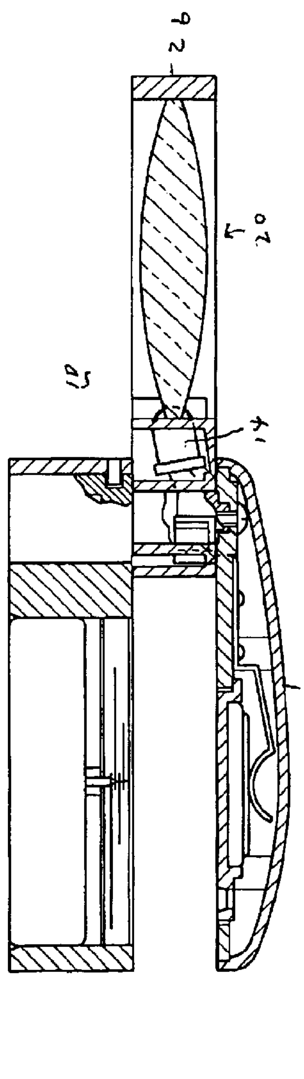
FIG. 21 is a sectional view taken along the line 21—21 of FIG. 20 and looking in the direction of the arrows.

When the cover 19 and lens 20 are displaced 180 degrees relative to each other, the contacts 40 and 46 are aligned (FIG. 19), and the contacts 42 and 44 are aligned (FIG. 22). In this condition, pressing the switch 16 completes a circuit through the LED 14, turning it on.

To deploy a clock constructed in accordance with the invention so that it can display the time, it is only necessary to pivot the cover 19 relative to the clock housing 26 so that the clock is changed from the storage configuration illustrated for example in FIG. 1, in which the overall dimensions of the clock are minimized, to the first deployed configuration illustrated for example in FIG. 7. With the lens overlying the clock face, the clock switch, which is now at the top of the cover 19, can be pressed to turn the LED on. Since the LED 14 is mounted in the lens housing 26 and moves with the lens 20, it illuminates the lens and the clock face 12. The lens is, as indicated above, optimally positioned to magnify the clock face.

Figure 19:
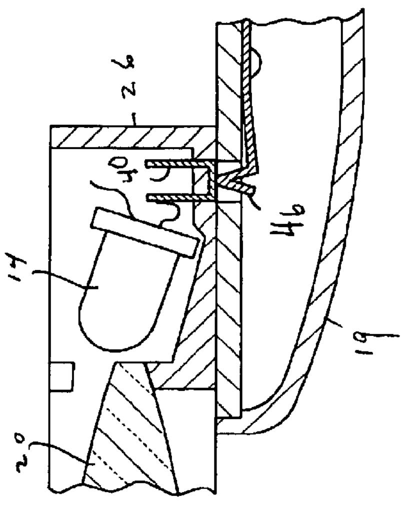
FIG. 19 is a view taken along the bent line 19—19 of FIG. 16 and looking in the direction of the arrows.
Figure 16:
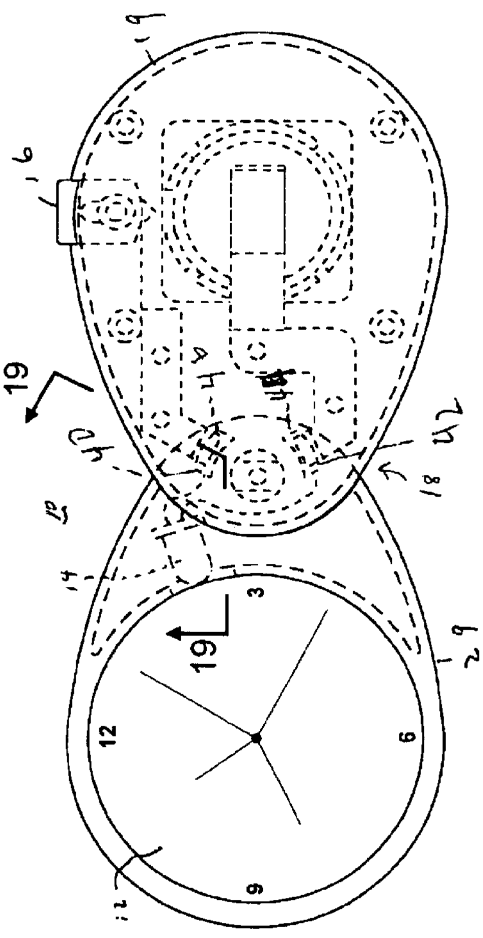
FIG. 16 is a front view corresponding to FIG. 6 showing some of the interior mechanism in broken lines.

The clock also has an auxiliary use as a magnifying device. With the lens deployed in the second deployment configuration shown, for example, in FIG. 11, the contacts 40,46 and 42, 44 are respectively brought together as illustrated in FIGS. 19 and 22. Then, pressing the switch 16 turns the LED 14 on so that the lens can be used as an illuminating lens for magnifying another object. The clock can thus be used as an aid for reading fine print or investigating small physical details in any nearby object of interest.

Thus there is provided in accordance with the invention a novel and highly effective travel alarm clock that can be used in the dark, that has a long-lasting battery, that is small yet easy to read, and that has an important auxiliary use. Many modifications of the preferred embodiment disclosed herein will readily occur to those skilled in the art. All such modifications as fall within the appended claims are included within the scope of the invention.

What is claimed is:

1. A clock comprising a housing with a face, a magnifying lens that can overlie the face, and a cover that covers the lens and face when the clock is stored and uncovers at least the face when the clock is deployed for displaying the time, wherein:

the lens is adjacent the face when the cover covers the lens and face and is moved perpendicularly away from the face in response to uncovering of the face by the cover;

further comprising a light for illuminating the face, a switch for controlling the light, and means for preventing the switch from turning the light on when the clock is stored and enabling the switch to turn the light on when the clock is deployed; and a shaft connecting the housing, the lens and the cover, wherein the lens can pivot on the shaft substantially 360 degrees relative to the face and cover and can be deployed to magnify an object other than the face.

2. A clock according to claim 1 wherein the cover and shaft can pivot substantially 180 degrees relative to the face.

3. A clock according to claim 1 wherein the cover and shaft can pivot substantially 180 degrees relative to the face, and comprising moving means constructed so that, when the cover and shaft pivot from a condition wherein the cover covers the face to a condition wherein the cover uncovers the face, the separation along the axis of the shaft between the lens and face increases.

4. A clock according to claim 3 wherein the moving means comprises a helical cam concentric with the shaft and fixed relative to one of the cover and face and a cam follower operatively associated with the cam and fixed relative to the other of the cover and face.

5. A clock comprising a housing with a face, a magnifying lens that can overlie the face, and a cover that covers the lens and face when the clock is stored and uncovers at least the face when the clock is deployed for displaying the time, wherein:

the lens is adjacent the face when the cover covers the lens and face and is moved perpendicularly away from the face in response to uncovering of the face by the cover;

further comprising a light for illuminating the face, a switch for controlling the light, and means for preventing the switch from turning the light on when the clock is stored and enabling the switch to turn the light on when the clock is deployed; and a first pair of contacts fixed relative to the cover and a second pair of contacts fixed relative to the lens, wherein:

the contacts are sufficiently aligned to enable the switch to turn the light on only when the cover and lens are sufficiently displaced relative to each other.

6. A clock according to claim 5 wherein the contacts are sufficiently aligned to enable the switch to turn the light on only when the cover and lens are displaced substantially 180 degrees relative to each other.

* * * * *